Oct. 12, 1965

E. H. REPLOGLE 3,211,175

VALVE REGULATOR

Filed April 3, 1961

INVENTOR.
Edward H. Replogle
BY
Popp and Sommer
ATTORNEYS.

INVENTOR.
Edward H. Replogle
BY
Popp and Sommer
ATTORNEYS.

United States Patent Office 3,211,175
Patented Oct. 12, 1965

3,211,175
VALVE REGULATOR
Edward H. Replogle, 666 Burroughs Drive, Snyder, N.Y.
Filed Apr. 3, 1961, Ser. No. 100,428
6 Claims. (Cl. 137—493)

This invention relates to improvements in valve regulators, and more particularly to such a regulator embodied in self-contained air-breathing apparatus which is used for underwater diving, fire fighting or as a respirator and the like.

An important object of the present invention is to provide a valve regulator which may also be used as an on-off valve with a controlled closing load. Heretofore, a pressure regulating valve was provided separate from the shut-off valve.

Another object is to provide such a valve regulator which is adjustable for regulating selectively the pressure desired.

A further object is to provide such a valve regulator which permits the air supply tank with which the regulator is associated to be recharged through the port of the regulator which is normally used as the outlet for pressure regulated air.

Still another object is to provide such a valve regulator which incorporates overpressure relief valve means on the output side of the regulator so that it and the medium pressure output hose are protected from the overpressures incurred during charging.

Other objects are to provide such a valve regulator which is simple in construction and relatively inexpensive, reliable in operation and not likely to get out of order or require repair.

Still other objects and advantages of the present invention will be apparent from the following detailed description of a preferred embodiment thereof which is illustrated in the accompanying drawings wherein.

Figure 1:
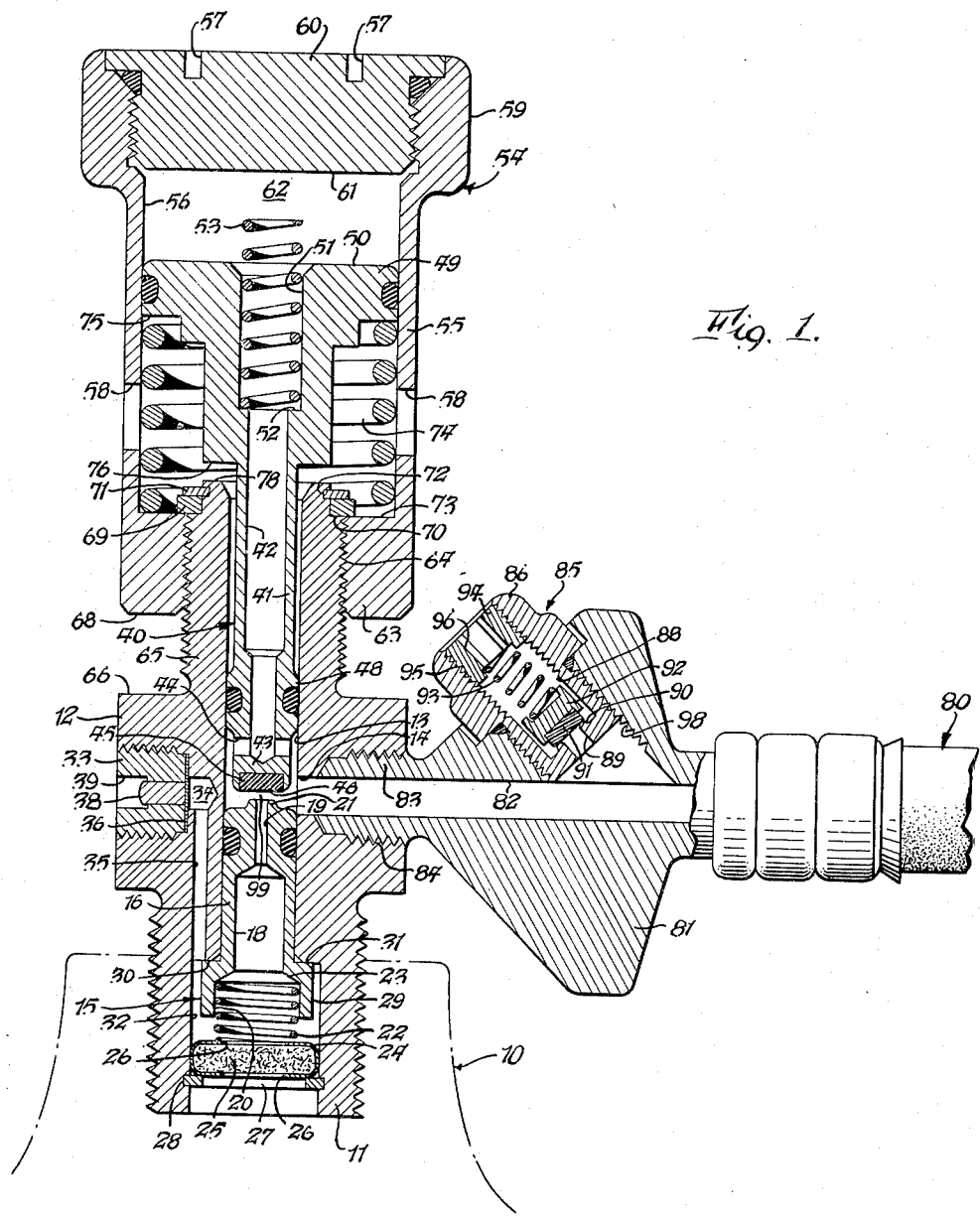
FIG. 1 is a central longitudinal sectional view through a preferred form of valve regulator constructed in accordance with the principles of the present invention and illustrating the same in regulating position.

The preferred embodiment of the inventive valve regulator is illustrated in the drawings as mounted on a tank represented by the numeral 10. This tank is shown as having an internally threaded mouth or opening which receives the externally threaded reduced lower end 11 of a vertically elongated regulator body member 12. The body member 12 is formed with a longitudinal bore or vertical cylindrical through passage 13 which communicates intermediate its ends with a lateral passage 14 also formed in the body member. The passage 14 serves as the outlet for the regulator in normal usage.

Slidably but sealingly arranged in the lower portion of the vertical bore 13 is a seat member indicated generally at 15. This seat member is shown as including a tubular body 16 of circular form in cross section and having a passage 18 extending vertically therethrough and including an upper portion 19 of reduced diameter and a lower portion 20 of enlarged diameter. The upper end of the seat member 15 is formed to provide a raised annular seat 21 which surrounds the upper end of the reduced passage portion 19.

Means are provided for urging the seat member 15 upwardly. Such means are shown as comprising a helical compression spring 22 which at its upper end seats against a downwardly facing shoulder 23 formed by the mergence of the different diametered passage portions 18 and 20. The lower end of the spring 22 is shown as bearing against the upper surface of a filter element 24. This element is shown as including a case of circular disc-shaped form confining a body 25 of suitable fibers and each of the upper and lower walls of the case has an aperture 26 to allow the flow of gaseous fluid through the filter element. The filter element 24 is shown as supported on a snap ring 27 which is held in an internal groove 28 formed in the lower end portion 11 of the regulator body member.

Means are provided to limit upward travel of the seat member 15. For this purpose, the lower end portion of the seat body member 15 is shown enlarged as indicated at 29 to provide an upwardly facing shoulder 30 adapted to abut a downwardly facing shoulder 31 formed on the regulator body member 12 by reason of the counterbore 32 formed in this member in the lower end of the vertical bore 13.

A safety plug 33 is shown as having a threaded engagement with the wall of an enlarged outer portion of a recess 34 formed in the regulator body member 12. The inner end of this recess communicates with the counterbore 32 via a vertical passage 35. While the safety plug 33 may be of any suitable construction, the same is shown as comprising a hollow plug restraining a thin frangible diaphragm 36 arranged at the inner end of the block and which diaphragm is also backed up by a body 38 of fusible metal arranged in the through hole 39 of the plug. This plug provides protection against overpressure in the tank 10 and also against overheating.

A valve spool member indicated generally at 40 is shown arranged in the upper portion of the vertical bore or passage 13 in the regulator body member 12. The valve spool member 40 is shown as comprising a tubular body 41 having a central longitudinally extending or vertical passage 42. The lower end of the tubular body 41 is closed by the cup-shaped head 43 but the passage 42 immediately above the head 43 has communication with the main passage 13 in the regulator body member 12 via a transverse hole or passage 44. The cup-shaped head 43 is shown as carrying a valve element 45 having a downwardly facing surface 46 adapted to engage the upwardly facing seat 21 on the seat member 15. The valve element 45 is preferably made of a hard plastic material such as nylon or Teflon.

The valve spool member 40 is guided in its vertical movement adjacent its lower end by a lobe or land 48 which is slidably but sealingly arranged in the upper portion of the bore 13 in the regulator body member 12. The upper end of the valve spool member 40 is shown as enlarged to provide an annular piston head 49 having an upper end face 50. The upper end of the passage 42 in the valve spool member 40 is shown as enlarged by a counterbore 51 to provide an upwardly facing annular shoulder 52 disposed inwardly of the piston upper end face 50. A helical spring 53 is shown as arranged in the counterbore 51 with its lower end bearing against the shoulder 52. The purpose of this spring 53 will be explained later herein.

The piston head 49 is shown as arranged within a cylinder member indicated generally at 54. This cylinder member 54 is shown as including a side wall 55 having a cylindrical internal surface 56 on which the circular periphery of the piston head 49 is slidably but sealingly arranged. One or more vent holes or openings 58 are shown in the side wall 55 so as to place the interior and exterior of the cylinder member in communication with each other below the piston head 49.

The cylinder member 54 is shown as enlarged at its upper end as indicated at 59 to provide a knob. The exterior of the knob portion 59 may be knurled or formed into suitable out-of-round contour to permit the cylinder member to be readily turned or manipulated about its vertical axis. The knob portion 59 is shown as provided with internal threads to receive the external threads on a plug 60 which when tightened in place seals the upper end of this cylinder member. Recesses 57 in the outer or upper end face of the plug 60 are preferably provided for the reception of the lugs of a spanner wrench (not shown) or other suitable tool to permit the plug to be tightly applied to the knob portion 59. The removable plug 60 is necessary for the assembly of certain parts within the cylinder member 54, as will be apparent.

Thus, the cylinder member 54 is provided with an upper horizontal end wall having an inner end face 61 which opposes the end face 50 on the piston head 40 to provide jointly therewith a chamber 62. The chamber 62 is in constant communication with the outlet 14 via the counterbore 51, vertical passage 42, lateral passage 43, and intermediate portion of bore 13.

The lower end of the cylinder member 54 is shown as provided with a horizontal integral end wall 63 having an internally threaded vertical opening therein as indicated at 64. This threaded opening 64 screws onto an externally threaded upstanding reduced portion 65 of the regulator body member 12. The base of the reduced portion or neck 65 provides an upwardly facing shoulder 66 adapted to be abuttingly engaged by the lower end face 68 on the end wall 63 of the cylinder member 54. Engagement of the opposing surfaces 66 and 68 limits downward movement of the cylinder member 54 toward the body member 12. The cylinder member 54 may be turned upon the threaded neck 65 so as to adjust its axial position relative thereto by grasping the knob portion 59 on the upper end of the cylinder member.

Stop means are provided to limit the upward movement of the cylinder member 54 relative to the regulator body member 12. Such means are shown as comprising a washer 69 fitted on an upwardly facing shoulder 70 formed by reducing the upper extremity of the neck 65. Arranged above the washer 69 and serving to retain the same against the shoulder 70 is a snap ring 71 which fits partially into an annular groove 72 formed externally in the neck 65 adjacent its upper end. The inner or upper end face 73 of the lower end wall 63 of the cylinder member 54 is adapted to engage abuttingly the downwardly facing exposed marginal portion of the washer 69, as shown in FIG. 1.

A helical spring 74 is shown as arranged within the cylinder member 54 with its upper end bearing against the lower horizontal surface 75 of the piston head 49. The lower end of the spring 74 is shown as bearing against the upwardly facing lower end wall surface 73.

Means are provided to limit the downward travel of the valve spool member 40 with respect to the regulator body member 12. Such means are shown as comprising a downwardly facing annular shoulder 76 formed on the valve spool member 40 below the piston head 49 thereon. This shoulder 76 is adapted to engage abuttingly the upper end face 78 of the neck portion 65 of the regulator body member 12.

The numeral 80 represents a medium pressure hose or conduit shown as having a fitting 81 suitably connected to one end thereof. This fitting 81 is shown in the form of a hand wheel having a horizontal central through passage 82 communicating with the interior of the hose 80, and also includes an externally threaded neck 83 adapted to be screwed into an internally threaded enlarged outer portion 84 of the outlet passage 14 for the regulator body member 12. It will be seen that the hose 80 is connected to the outlet 14 by manually screwing the neck 83 into the recess 84 so as to place the outlet passage 14 in fluid communication with the hose interior via the fitting passage 82.

The fitting 81 is shown as carrying an overpressure relief valve assembly indicated generally at 85. The assembly 85 is shown as comprising a tubular body 86 having a passage 88 extending therethrough, the inner end portion of which is of reduced diameter as indicated at 89. The shoulder provided by the different diametered portions 88 and 89 is shown as formed to provide an outwardly facing annular seat 90 which surrounds the outer end of the reduced passage portion 89. Urged against this seat 90 is a valve element 91 mounted on a valve carrier 92. The valve carrier 92 is reciprocally arranged in the enlarged passage portion 88 and is urged toward the seat 90 by a helical compression spring 93, one end of which bears against this carrier and the other end of which bears against an inwardly facing shoulder formed on a hollow plug 94. The plug 94 is provided with external threads which screw into the internal threads formed at the outer end of the enlarged passage portion 88, as indicated at 95. The plug 94 has a through passage 96 therein which is adapted to communicate with the passage portion 88 and also with the passage portion 89 when the valve 91 is unseated or open. The body 86 of the valve assembly 85 is shown as externally threaded to screw into an internally threaded hole or passage 98 which extends through one side of the fitting 81 so as to intercept the central through passage 82.

It will be seen that when the pressure in the passages 82, 98 and 89 exceed a predetermined level determined by the adjustment of the retainer plug 94, the valve 91 will move away from the seat 90 against the urging of the spring 93 and thereby permit air to flow past the valve and be vented.

The tank valve regulator described is illustrated in FIG. 1 in regulating position to produce the highest pressure. A tank such as 10 used in air-breathing apparatus is often charged to a pressure of about 2200 pounds per square inch (hereinafter referred to as p.s.i.) and a typical regulated pressure is 100 p.s.i. It will be seen that the spacing indicated at 99 between the opposing faces of the valve 46 and salient of the seat 21 provides a restricted orifice which is variable in size depending upon the disposition of the valve with respect to the seat. The smaller this spacing, the greater the pressure drop that occurs in air which flows upwardly through passage 19 in seat member 15 into the intermediate portion of the vertical passage 13 in the regulator body member 12 opposite the lateral outlet 14. On the other hand, when the spacing 99 is made larger, less of a pressure drop occurs across the upstream and downstream sides of the seat 21.

An important feature of the invention regulator is that the valve 46 is adjustable relative to the seat 21 so as to permit the desired adjustment in the regulated pressure. Adjustment is effected by rotating the cylinder member 54, effected by manipulating the knob portion 59 thereof. When the cylinder member 54 is backed off away from the seat member 15 until the cylinder end face 73 engages the stop washer 69 as shown in FIG. 1, this end face which provides a support for the lower end of the valve spool member spring 74 has been raised the maximum distance possible relative to the seat member 15 so that a balance of forces acting upon the valve spool member 40, as hereinafter discussed, positions this member away from the seat member 15 the maximum distance possible due to influence by the spring 74. This makes the spacing 99 the largest possible and therefore produces the smallest pressure drop resulting relatively in the highest pressure on the downstream side of the restriction 99.

In this regulating position for highest pressure as illustrated in FIG. 1, it will be noted that the spring 53 does not contact the end face 61 of the cylinder member 54. The forces which influence upward movement of the valve spool member 40 include the force exerted by the spring 74, the force due to regulated pressure in the bore 13 downstream of the restriction 99 acting against the effective area of the lower end face of the valve spool member 40 which is the cross sectional area of bore 13, and ambient pressure exerted against the effective area of the lower face of the piston head 49. The force which influences downward movement of the valve spool member 40 is that due to regulated pressure of the fluid downstream of the restriction 99 present in the chamber 62 acting against the effective area of the upper end face 50 of the piston head 49. When these various forces are in balance, the valve spool member 40 is at rest and is in a given position with respect to the seat member 15 thereby determining the size of the restriction 99. It will be noted from examination of FIG. 1 that when the cylinder member 54 is adjusted to place the regulator in regulating position, the valve spool shoulder 76 is separated from the regulator body member end face 78.

It will be seen that by turning down the cylinder member 54 so as to move the same axially downwardly toward the central portion of the regulator body member 12, the lower support 73 for the spring 74 also moves downwardly. This tends to unload the spring 74 and causes the valve spool member 40 to move downwardly following the spring in order to maintain the balance of forces. Downward movement of the valve spool member 40 relative to the seat member 15 reduces the size of the restriction 99. This produces a greater pressure drop across this restriction and hence a lower regulated pressure on the downstream side of the seat 21.

Figure 2:
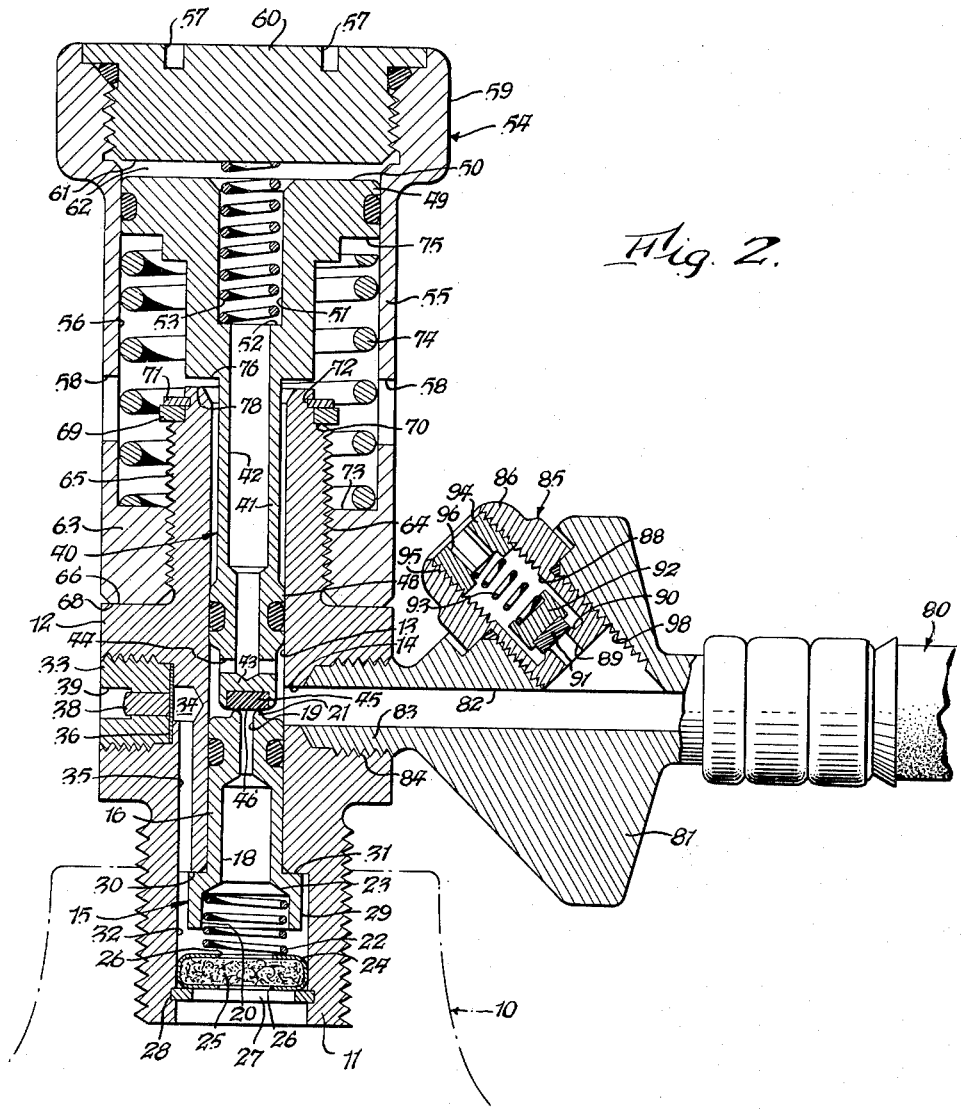
FIG. 2 is a similar view thereof but illustrating the regulator in an off position.

If the cylinder member 54 is screwed down as far as it will go, this being determined by the opposing surfaces 68 and 66 abutting each other, it is a feature of the present invention that the valve spool member spring 74 is completely unloaded and the spring 53 is loaded. The spring 74 has an overall effective length when in a relaxed or completely unloaded condition which is shorter than the axial distance between the lower end face 75 of the piston head 49 and the opposing cylinder end face 73, when the cylinder member 54 is in the fully screwed down condition as shown in FIG. 2. The spring 53 has an overall length when in a relieved or completely unloaded condition which is less than the axial distance between the opposing cylinder end face 61 and the valve spool shoulder 52, when the cylinder is in a fully backed off condition as shown in FIG. 1. However, as the cylinder member 54 moves downwardly from the position shown in FIG. 1 to that shown in FIG. 2, the cylinder end face 61 is lowered into engagement with the upper end of the spring 53. This engagement occurs before the lower end face 68 of the cylinder member 54 abuttingly engages the shoulder 66 on the regulator valve body 12 and loads the spring 53 by partially compressing it.

It will be understood that as the cylinder member 54 is screwed down thereby relieving the effectiveness of the valve spool member spring 74, the valve spool member 40 will follow also in a downward direction until its valve element 46 engages the salient or crest of the seat 21. When this occurs, flow through the passage 19 in the seat member 15 ceases and the downstream pressure in the outlet chamber 14 and also in the chamber 62 communicating therewith, dissipates so that the downward force upon the valve spool member 40 acting against the piston end face 50 disappears. This leaves the compressed spring 53 to exert a predetermined holddown force against the valve spool member 40 to urge the same against the seat member 15. Such an "off" position of the regulator is illustrated in FIG. 2.

Figure 3:
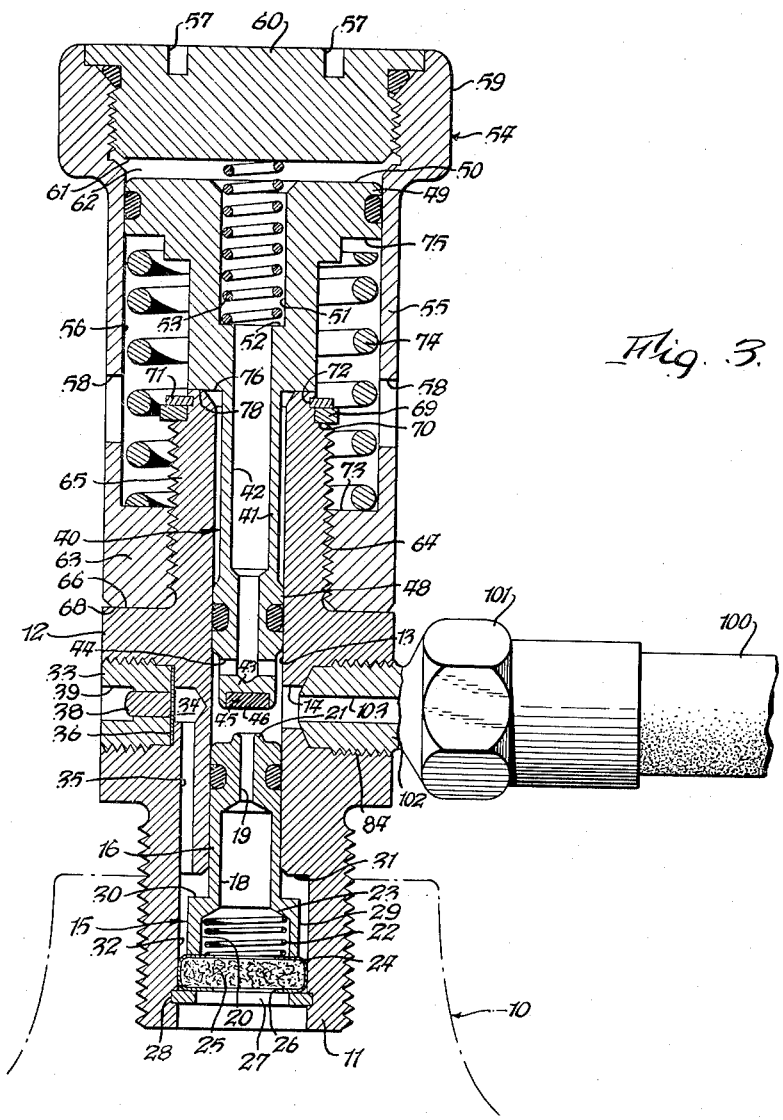
FIG. 3 is a somewhat similar view thereof but showing the medium pressure output hose and the fitting at one end thereof illustrated in the other figures, removed and replaced by a high pressure hose used for charging and thereby illustrating the regulator in charging position.

When it is desired to recharge the tank 10, this can be effected in a very simple manner, utilizing the outlet 14. Thus, the medium pressure hose fitting 81 is unscrewed so as to disconnect the threaded neck 83 thereof from the outlet threaded portion 84. Referring to FIG. 3, a high pressure hose or conduit 100 having a fitting 101 suitably connected to one end thereof, is substituted for the removed medium pressure hose 80 with its fitting 81. The high pressure hose fitting 101 is shown as having an externally threaded neck 102 which screws into the internally threaded outlet portion 84. The fitting 101 has a through passage 103 which at one end connects with the outlet passage 14 of the regulator body member 12 and at its other end communicates with the interior of the hose 100.

After the high pressure hose 100 is connected to the regulator body member 12 as illustrated in FIG. 3, a valve (not shown) at the remote end of the high pressure hose 100 is turned on to allow high pressure air, such as at a pressure of 2200 p.s.i., to flow through this hose and enter the passage 14. Any suitable source (not shown) for supplying air at this pressure may be employed such as a tank or compressor. Since the intermediate portion of the vertical bore 13 in the regulator body member 12 communicates with the outlet passage 14, this high pressure is present in the chamber 62 between the piston head 49 and cylinder end wall 60 via the interconnected passages 44, 42 and 51. The high charging pressure effective over the piston end face 50 urges the valve spool member 40 firmly downwardly so that the shoulder 76 on the valve spool member is forcefuly held against the stop surface 78 on the regulator body member 12.

The high charging pressure also acts against the exposed upper end face of the seat member 15. This produces a downward force on the seat member 15 so as to separate its shoulder 30 from the opposing stop surface 31 on the regulator valve body 12. Such downward movement of the seat member 15 is against the urging of the seat member spring 22 but this srping is overcome by the aforesaid pneumatically induced downward force. As soon as the seat member 15 moves downwardly to provide a spacing such as 99 between the opposing faces of the seat 21 and valve 46, the full effective area of the upper end face of the seat member is subjected to the high pressure air entering the portion of the bore 13 between the valve spool member 40 and seat member. Inasmuch as the passage portion 19 in the seat member is of somewhat restricted cross sectional area in relation to the enlarged passage portion 18, a sufficient pressure differential is developed across the seat member 15 during the charging operation or flow into the tank 10 as to maintain the seat member in a lowered position. However, as the pressure in the tank 10 builds up, it will be seen that flow into the tank subsides and this gradually eliminates the pressure differential across the seat member, thereby permitting it, under the urging of its spring 26, to move upwardly again until the shoulder 30 on the seat member engages the stop surface 31 on the regulator body member 12.

After the tank 10 has been filled to charging pressure, the valve (not shown) in the high pressure hose 100 is shut off. Thereafter, the fitting 101 is slowly unscrewed so as to bleed off the high pressure fluid trapped in the intermediate portion of the passage 13 and outlet 14. Following removal of the high pressure hose 100 with its fitting 101, the medium pressure hose 80 with its fitting 81 may be replaced so as to restore the regulator to the condition illustrated in FIG. 2 in which the regulator is in an off position.

By "air" as used herein is meant any gaseous fluid that may be confined within the tank and suitable for the purpose intended. While the inventive valve regulator has been illustrated as mounted on a tank, it will be understood that the regulator may be operatively associated with any source of gaseous fluid.

From the foregoing, it will be seen that the preferred embodiment of the present invention illustrated achieves the various objectives stated. While changes in the embodiment shown and described may occur to those skilled in the art, it is understood that the same is illustrative and not limitative of the present invention, the scope of which is measured by the appended claims.

What is claimed is:

1. In a regulator, the combination comprising a body member having an outwardly extending externally threaded portion and a first passage, means providing a second passage communicating with said first passage and surrounded by a seat, a valve spool member movably arranged on said body member and including a valve opposing said seat and adapted to engage the same and close said second passage and also including a piston head having an end face, said valve spool member having a third passage establishing communication between said first passage and said piston end face, a cylinder member having a closed first end wall at one end opposing said piston end face and an internally threaded opening in a second end wall at the other end and receiving said portion whereby said cylinder member is adjustably mounted on said body member, stop means on the outer end of said portion and arranged within said cylinder member and adapted to be engaged by the inside of said second end wall to limit outward movement of said cylinder member away from said body member, and spring means arranged between said second end wall and piston head.

2. In a valve regulator, the combination comprising a body member having a shoulder surface and a reduced externally threaded portion extending outwardly from said shoulder surface and also having a first passage, means providing a second passage communicating with said first passage and surrounded by a seat, a valve spool member movably arranged on said body member and including a valve opposing said seat and adapted to engage the same and close said second passage and also including a piston head having an end face, said valve spool member having a third passage establishing communication between said first passage and said piston end face, a cylinder member having a closed first end wall at one end opposing said piston end face and an internally threaded opening in a second end wall at the other end and receiving said externally threaded portion whereby said cylinder member is adjustably mounted on said body member, said second end wall being adapted to engage said shoulder surface to limit inward movement of said cylinder member toward said body member, stop means on the outer end of said portion and arranged within said cylinder member and adapted to be engaged by the inside of said second end wall to limit outward movement of said cylinder member away from said body member, and spring means arranged between said second end wall and piston head.

3. In a valve regulator, the combination comprising a body member having a shoulder surface and a reduced externally threaded portion extending outwardly from said shoulder surface and also having a first passage, means providing a second passage communicating with said first passage and surrounded by a seat, a valve spool member movably arranged on said body member and including a valve opposing said seat and adapted to engage the same and close said second passage and also including a piston head having an end face, said valve spool member having a third passage establishing communication between said first passage and said piston end face, a cylinder member having a closed first end wall at one end opposing said piston end face and an internally threaded opening in a second end wall at the other end and receiving said externally threaded portion whereby said cylinder member is adjustably mounted on said body member, said second end wall being adapted to engage said shoulder surface to limit inward movement of said cylinder member toward said body member, stop means on the outer end of said portion and arranged within said cylinder member and adapted to be engaged by the inside of said second end wall to limit outward movement of said cylinder member away from said body member, and spring means arranged between said second end wall and piston head and being unloaded when said second end wall engages said shoulder surface.

4. In a valve regulator, the combination comprising a body member having a first passage, means providing a second passage communicating with said first passage and surrounded by a seat, a valve spool member movably arranged on said body member and including a valve opposing said seat and adapted to engage the same and close said second passage and also including a piston head having an end face, said valve spool member having a third passage establishing communication between said first passage and said piston end face, a cylinder member adjustably mounted on said body member for movement axially of said valve spool member and having an end wall opposing said piston end face, stop means limiting inward movement of said cylinder member toward said body member, first spring means arranged between said cylinder member and piston head on the side thereof opposite from said end face and being unloaded when said cylinder member is at the limit of its inward movement as determined by said stop means, and second spring means arranged between said cylinder member and piston head on said end face side thereof and operative to urge said valve spool member into valve closing engagement with said seat thereby to provide a controlled valve closing load.

5. In a valve regulator, the combination comprising a body member having a first passage, means providing a second passage communicating with said first passage and surrounded by a seat, a valve spool member movably arranged on said body member and including a valve opposing said seat and adapted to engage the same and close said second passage and also including a piston head having an end face, said valve spool member having a third passage establishing communication between said first passage and said piston end face, a cylinder member adjustably mounted on said body member for movement axially of said valve spool member and having an end wall opposing said piston end face, stop means limiting inward movement of said cylinder member toward said body member, first spring means arranged between said cylinder member and piston head on the side thereof opposite from said end face and being unloaded when said cylinder member is at the limit of its inward movement as determined by said stop means, and second spring means arranged between said cylinder member and piston head on said end face side thereof and operative to urge said valve spool member into valve closing engagement with said seat, said second spring means being normally unloaded when said cylinder member is not at its said limit of inward movement but being loaded when said cylinder member is at its said limit of inward movement thereby to provide a controlled valve closing load.

6. In a valve regulator, the combination comprising a body member having a first passage, means providing a second passage communicating with said first passage and surrounded by a seat, a valve spool member movably arranged on said body member and including a valve opposing said seat and adapted to engage the same and close said second passage and also including a piston head having an end face, said valve spool member having a third passage establishing communication between said first passage and said piston end face, a cylinder member adjustably mounted on said body member for movement axially of said valve spool member and having an end wall opposing said piston end face, stop means limiting inward movement of said cylinder member toward said body member, first spring means arranged between said cylinder member and piston head on the side thereof opposite from said end face and being unloaded when said cylinder member is at the limit of its inward movement as determined by said stop means, second spring means arranged between said cylinder member and piston head on said end face side thereof and operative to urge said valve spool member into valve closing engagement with said seat thereby to provide a controlled valve closing load, and second stop means limiting inward movement of said valve spool member toward said seat.

References Cited by the Examiner

UNITED STATES PATENTS

| | | | |
|---|---|---|---|
| 2,855,950 | 10/58 | Phillips | 137—505.28 |
| 2,908,158 | 10/59 | Jacobsson | 137—505.11 XR |
| 2,966,916 | 1/61 | Cummins | 137—612.1 XR |
| 3,004,686 | 10/61 | McKee | 137—505.28 XR |

FOREIGN PATENTS

| | | |
|---|---|---|
| 297,270 | 9/28 | Great Britain. |
| 718,892 | 11/54 | Great Britain. |

LAVERNE D. GEIGER, *Primary Examiner.*

LOUIS J. DEMBO, *Examiner.*